US007441037B2

(12) United States Patent
Saxena

(10) Patent No.: US 7,441,037 B2
(45) Date of Patent: Oct. 21, 2008

(54) AUTHORIZATION ACCESS CONTROLLED CONTENT EXCHANGE

(75) Inventor: Parichay Saxena, Milpitas, CA (US)

(73) Assignee: Microsoft Corporation, Redmond, WA (US)

( * ) Notice: Subject to any disclaimer, the term of this patent is extended or adjusted under 35 U.S.C. 154(b) by 224 days.

(21) Appl. No.: 11/277,120

(22) Filed: Mar. 21, 2006

(65) Prior Publication Data

US 2006/0168222 A1 Jul. 27, 2006

Related U.S. Application Data

(62) Division of application No. 10/185,444, filed on Jun. 26, 2002.

(51) Int. Cl.
*G06F 15/16* (2006.01)

(52) U.S. Cl. .................. 709/229; 709/202; 709/205; 709/212; 709/218; 709/231; 709/232; 725/25; 725/30

(58) Field of Classification Search .......... 709/202, 709/219, 225, 229, 205, 212, 218, 231, 232
See application file for complete search history.

(56) References Cited

U.S. PATENT DOCUMENTS

| 4,800,488 | A | | 1/1989 | Agrawal et al. | |
| 5,701,451 | A | * | 12/1997 | Rogers et al. | 707/1 |
| 5,754,938 | A | | 5/1998 | Herz et al. | |
| 5,819,271 | A | | 10/1998 | Mahoney et al. | |
| 5,864,871 | A | | 1/1999 | Kitain et al. | |
| 5,987,454 | A | | 11/1999 | Hobbs | |
| 6,006,332 | A | | 12/1999 | Rabne et al. | |
| 6,070,160 | A | | 5/2000 | Geary | |
| 6,173,406 | B1 | * | 1/2001 | Wang et al. | 726/3 |
| 6,269,361 | B1 | | 7/2001 | Davis et al. | |

(Continued)

FOREIGN PATENT DOCUMENTS

WO WO9843426 10/1998

(Continued)

OTHER PUBLICATIONS

Chathapuram, "Security in Peer-to Peer Networks", P2P Aug. 8, 2001 XP002251813, availabe at <<http://netserver.cerc.wvu.edu/classes/cs491h_summer2_2001/sankaran_securityoverv>>, retrieved Aug. 20, 2003, pp. 7-8.

(Continued)

*Primary Examiner*—Michael Won
(74) *Attorney, Agent, or Firm*—Lee & Hayes, PLLC

(57) ABSTRACT

Authorization access controlled content exchange can be implemented, for example, in a multimedia content distribution environment when individual client devices are capable of storing content. A content index is maintained for each client device that reflects the content stored thereat. Predefined authorization access information for each relevant content item may be included in a content index entry corresponding thereto. A profile is maintained that includes predetermined authorization access information which indicates access rights. A search may be performed by and/or on behalf of a requesting client device for desired content with reference to authorization access information. A content transfer to the requesting client device from a target client device may be enabled if the predetermined authorization access information comports with the predefined authorization access information. Searches may be orchestrated or effectuated by the requesting client device or a head end of the multimedia content distribution system.

18 Claims, 13 Drawing Sheets

U.S. PATENT DOCUMENTS

| | | |
|---|---|---|
| 6,381,640 B1 | 4/2002 | Beck et al. |
| 6,411,992 B1 | 6/2002 | Srinivasan et al. |
| 6,425,011 B1 | 7/2002 | Otani et al. |
| 6,675,205 B2 | 1/2004 | Meadway et al. |
| 6,742,028 B1 | 5/2004 | Wang et al. |
| 6,961,858 B2 * | 11/2005 | Fransdonk ............ 726/29 |
| 7,027,460 B2 | 4/2006 | Iyer et al. |
| 7,120,691 B2 | 10/2006 | Goodman et al. |
| 7,127,613 B2 | 10/2006 | Pabla et al. |
| 2002/0016846 A1 | 2/2002 | Ono |
| 2002/0038352 A1 | 3/2002 | Ashley |
| 2002/0138362 A1 | 9/2002 | Kitze et al. |
| 2002/0156893 A1 | 10/2002 | Pouyoul et al. |
| 2003/0088571 A1 | 5/2003 | Ekkel |
| 2003/0118014 A1 | 6/2003 | Iyer et al. |
| 2003/0177186 A1 | 9/2003 | Goodman et al. |
| 2003/0182421 A1 | 9/2003 | Faybishenko et al. |
| 2005/0015466 A1 | 1/2005 | Tripp |

FOREIGN PATENT DOCUMENTS

| | | |
|---|---|---|
| WO | WO0011871 | 3/2000 |
| WO | WO0106469 | 1/2001 |
| WO | WO0113201 A | 2/2001 |
| WO | WO0153963 | 7/2001 |

OTHER PUBLICATIONS

Kim, et al., "A secure platform for peer-to-peer computing in the internet", Proceedings of the Hawaii International Conference on System Sciences, Jan. 7, 2002, pp. 3948-3957.

"LimeWire Features: Lime Wire is free and contains no SpyWare", LimeWire, available at <<http://www.limewire.com/index.jsp/features_list>>, Sep. 14, 2001 retrieved Sep. 14, 2001, 3 pages.

Stolp, "Share it", available at <<http://ww.fokus.gmd.de/research/cc/magic/projects/share_it_content.html>>, Dec. 1, 2001, retrieved Apr. 8, 2004, 2 pages.

* cited by examiner

AUTHORIZATION ACCESS CONTROLLED CONTENT EXCHANGE

RELATED PATENT APPLICATION

This U.S. Nonprovisional Patent Application is a Divisional Application of prior and co-pending U.S. Nonprovisional patent application Ser. No. 10/185,444, filed on Jun. 26, 2002, and entitled "Authorization Access Controlled Content Exchange". Application Ser. No. 10/185,444 is hereby incorporated by reference in its entirety herein.

TECHNICAL FIELD

This disclosure relates in general to controlled content exchange and in particular, by way of example but not limitation, to content sharing across client devices that is controlled responsive to authorization access information.

BACKGROUND

Television-based entertainment systems are expanding the programming and services that they offer. In addition to television program content such as that found on broadcast and traditional cable networks, television service providers are adding on-demand video, as well as other interactive services, features, and applications. The corresponding content and additional information are downloaded over a television-based network for display, use, and/or storage on client-side set-top boxes (STBs) or similar devices. Enabling content storage is provided as a service and/or feature to subscribers in television-based entertainment systems.

The storage is typically accomplished using a hard disk or other mass memory storage medium in which the audio/video or other content is saved using any of many available formats, including those formats that compress the content. A subscriber can therefore order the STB to record content onto the hard disk by setting a channel, date, and time or by selecting a program listed on an electronic program guide (EPG). Subsequently, the subscriber can view the recorded content at his or her leisure. However, the subscriber is not always able to record programs that he or she may wish to subsequently view.

There may be many reasons for a subscriber failing to record a desired program. For example, there may be insufficient storage available on the hard disk. The subscriber may simply forget to order the STB to record a desired program, or the subscriber may be unaware that a desired program is to be broadcast prior to the broadcast. Alternatively, the EPG or other source of programming data may be inaccurate. Additionally, even if the programming data is accurate, the subscriber is aware of the program, and the subscriber correctly sets the STB, the subscriber is nonetheless subject to last minute and/or unannounced scheduling changes as to time, day, or channel by the broadcasting network.

Accordingly, for television-based entertainment systems, there is a need for schemes and techniques to provide a service and/or feature to subscribers to handle situations in which subscribers fail to record a desired program.

SUMMARY

Authorization access controlled content exchange can be implemented, for example, in a multimedia content distribution environment when individual client devices are capable of storing content. A content index is maintained for each client device that reflects the content stored thereat. Predefined authorization access information for each relevant content item may be included in a content index entry corresponding thereto. A profile is maintained that includes predetermined authorization access information which indicates access rights. A search may be performed by and/or on behalf of a requesting client device for desired content with reference to authorization access information. A content transfer to the requesting client device from a target client device may be enabled if the predetermined authorization access information comports with the predefined authorization access information. Searches may be orchestrated or effectuated by the requesting client device or a head end of the multimedia content distribution system. Content indexes of the client devices may be searched at the head end or at the individual client devices, depending on implementation.

BRIEF DESCRIPTION OF THE DRAWINGS

The same numbers are used throughout the drawings to reference like and/or corresponding aspects, features, and components.

DETAILED DESCRIPTION

The following discussion is directed to an exemplary multimedia content distribution system such as a television-based entertainment system. Such systems include interactive TV networks, cable/satellite networks that utilize electronic program guides and other applications, web-enabled TV networks, and so forth. Client devices in such systems range from full-resource clients with substantial memory and processing resources, such as TV-enabled personal computers and TV recorders equipped with hard-disks, to low-resource clients with limited memory and/or processing resources, such as traditional STBs. However, authorization access controlled content exchange as described herein may additionally be used in other environments such as those that distribute content with limitations regarding playability, recording, further distribution, and so forth. While aspects of the described systems and methods can be used in any of these environments and for any types of client devices, they are described primarily in the context of the following exemplary environment.

Exemplary System Architecture

Figure 1:
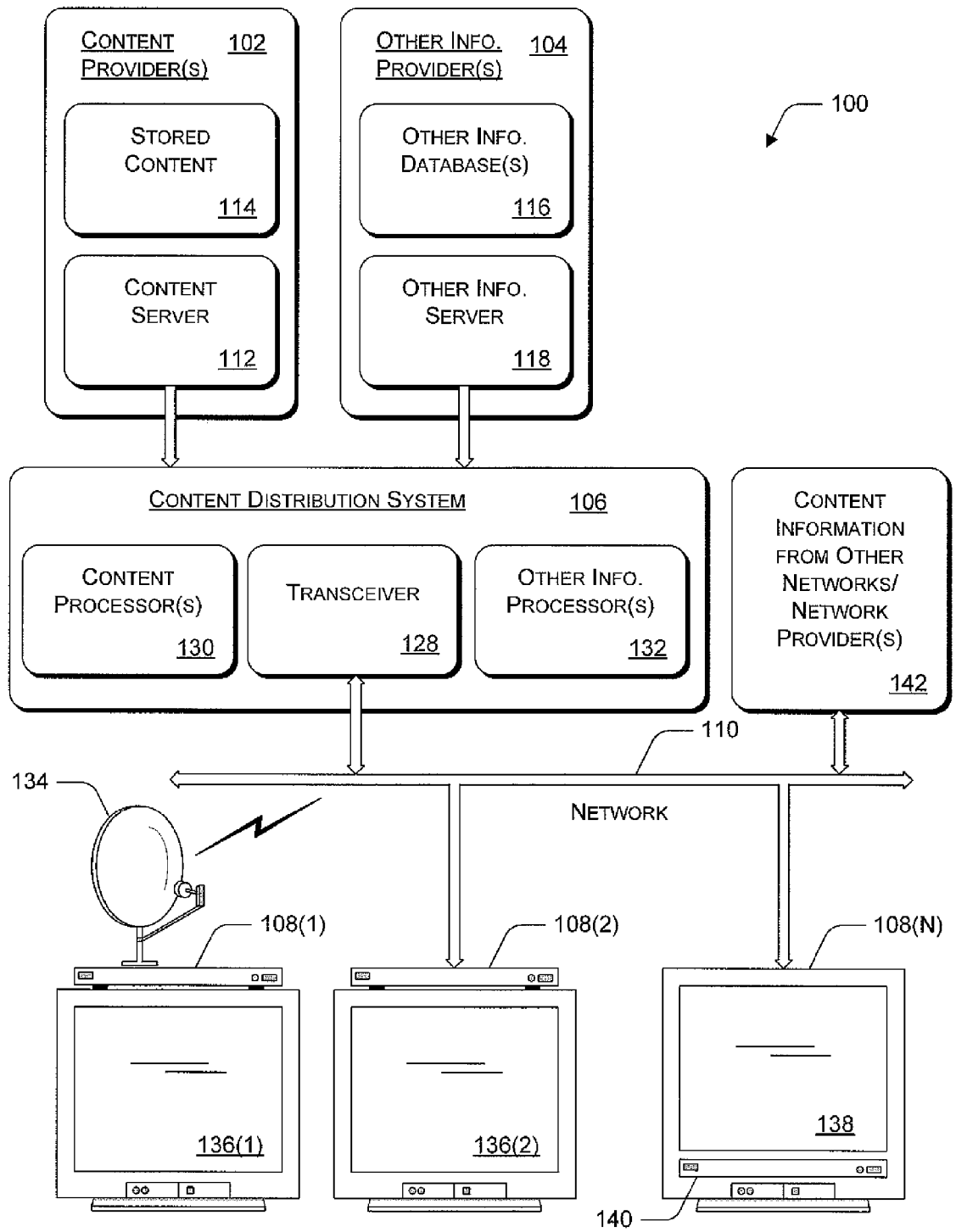
FIG. 1 illustrates an exemplary television system architecture in which the systems and methods for authorization access controlled content exchange can be implemented.

FIG. 1 illustrates an exemplary television-based entertainment system 100 that is an architecture in which authorization access controlled content exchange may be implemented. System 100 facilitates distribution of content and other information to multiple viewers. System 100 includes one or more content providers 102, zero, one or more other information providers 104, a content distribution system 106, and one or more client devices 108(1), 108(2), . . . , 108(N) coupled to content distribution system 106 via a network 110.

Content provider 102 includes a content server 112 and stored content 114, such as movies, television programs, commercials, music, and similar audio and/or video content. Content server 112 controls distribution of stored content 114 from content provider 102 to content distribution system 106. Additionally, content server 112 may control distribution of live content (e.g., content that was not previously stored, such as live feeds) and/or content stored at other locations to content distribution system 106.

Other information provider 104 includes other information database 116 and other information server 118. Other information database 116 stores other content information that may be provided to client devices 108. Such other content information includes software modules, images, text, executable programs, gaming or other interactive information, and so forth. Thus, the other information may also include multimedia content, especially content of an irregular, one-of-a-kind, or similar nature, content of an interactive type, or content from smaller independent providers. Other information server 118 processes the other information from other information database 116 prior to distribution to generate one or more files that are optimized for, or at least capable of, transmission to content distribution system 106 and/or distribution therefrom.

Content distribution system 106 includes a transceiver 128, one or more content processors 130, and one or more other information processors 132. Transceiver 128 can alternatively be a broadcast transmitter if bidirectional communication is not required. Transceiver 128 transmits (e.g., broadcasts) signals, such as cable/satellite television signals, across network 110. Network 110 can include a cable television network; an RF, microwave, satellite, and/or data network, such as the Internet; and may also include wired or wireless media using any transmission format or protocol. Additionally, network 110 can be any type of network (including a broadcast network), using any type of network topology and any network communication protocol, and can be represented or otherwise implemented as a combination of two or more networks.

Content processor 130 processes the content received from content provider 102 prior to transmitting the content across network 110. Similarly, other information processor 132 processes the other information that is received from other information provider 104 prior to transmission of the other information across network 110. A particular content processor 130 may encode, or otherwise process, the received content into a format that is understood by the multiple client devices 108(1), 108(2), . . . , 108(N) that are coupled to network 110. Content processor 130 and/or other information processor 132 may also tag content with authorization access information prior to distribution to the client devices 108.

Although FIG. 1 shows a single content provider 102, a single other information provider 104, and a single content distribution system 106, the exemplary system 100 can include any number of content providers and/or other information providers coupled to any number of content distribution systems. Thus, at least content distribution system 106, content provider 102, and/or other information provider 104 are individually or jointly representative of a headend service that provides content and other information to multiple subscribers.

Client devices 108 can be implemented in a number of ways. For example, a client device 108(1) receives content and other information from a satellite-based transmitter via a satellite dish 134. Client device 108(1) is also referred to as a set-top box or a satellite receiving device. Client device 108 (1) is coupled to a television 136(1) for presenting the content and other information (including audio, video, and/or audio/video content information) that are received by client device 108(1), as well as for presenting a graphical user interface. A particular client device 108 can be coupled to any number of televisions 136 and/or similar devices that can be implemented to display or otherwise render content. Similarly, any number of client devices 108 can be coupled to a single television 136.

Client device 108(2) is also coupled to receive content and other information from network 110 and to provide the received content and other information to associated television 136(2). Client device 108(N) is an example of a combination television 138 and integrated set-top box (STB) 140. In this example, the various components and functionality of the STB are incorporated into the television, rather than using two separate devices. STB 140 that is integrated into television 138 can receive signals (e.g., broadcast signals) via a satellite dish (similar to satellite dish 134) and/or directly via network 110. In alternate implementations, client devices 108 may receive signals via the Internet or any other network, especially those network mediums that are capable of handling so-called broadband transmissions. As is further described below, client devices 108 may engage in content exchanges between an among other client devices 108 under an authorization access information controlled mechanism.

The exemplary system 100 also includes content information from other networks/network providers 142, which may provide content information such as information streamed over the Internet, information received directly from a provider of the information, and so forth. Content information from other networks/network providers 142 may be accessible over network 110 (i.e., a network that also provides content information and other information via content distribution system 106). Alternatively, content information from other networks/network providers 142 may be accessible over a different network, including a wide area network (WAN), the Internet, a public or private telecommunications network, and so forth.

Exemplary Client Device

Figure 2:
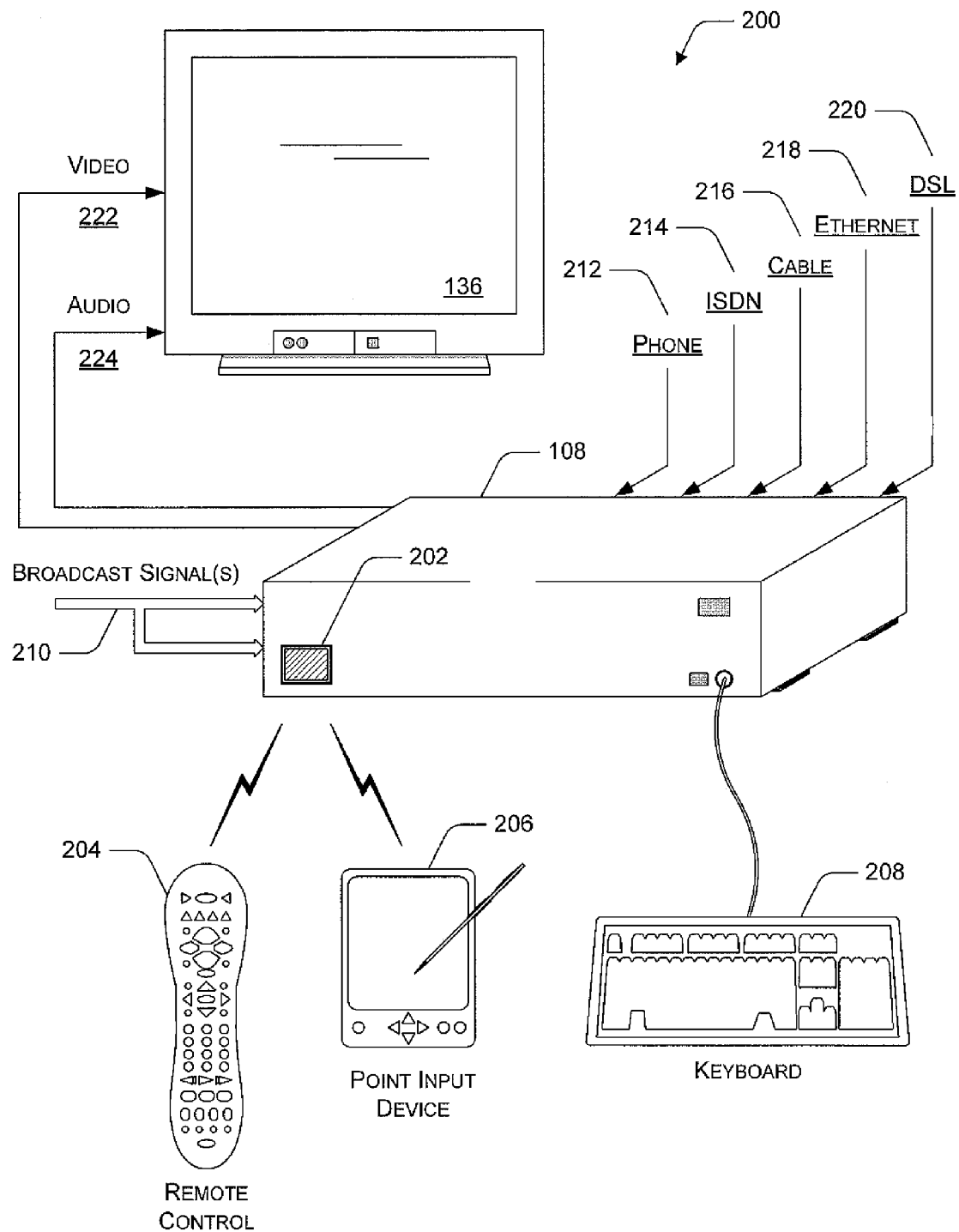
FIG. 2 illustrates an exemplary client device, a television, and various input devices that interact with the client device.

FIG. 2 illustrates an exemplary implementation 200 of a client device 108 that is shown as a standalone unit that connects to a television 136 and communicates with various input devices 204, 206, and 208. Client device 108 can be implemented in any number of embodiments, including as an STB, a satellite receiver, a TV recorder with a hard disk, a digital video record (DVR) (and playback system), a game console, an information appliance, a personal computer (PC), a personal digital assistant (PDA), a mobile telephone (MT), a tablet PC, a pocket or hand-sized PC, and so forth.

Client device 108 includes a wireless port 202, such as an infrared (IR) or Bluetooth wireless port, for receiving wireless communications from a remote control device 204, a handheld input device 206, or any other wireless device, such as a wireless keyboard. Handheld input device 206 can be a personal digital assistant (PDA), handheld computer, wireless phone, or the like. Additionally, a wired keyboard 208 can be coupled to communicate with client device 108. In alternate embodiments, remote control device 204, handheld device 206, and/or keyboard 208 may use an RF communication link or other mode of transmission to communicate with client device 108.

Client device 108 receives one or more (e.g., broadcast) signals 210 from one or more broadcast sources, such as from a satellite or a cable or a broadcast network, including a broadcast implementation of network 10 (of FIG. 1). Client device 108 includes hardware and/or software for receiving and decoding a broadcast signal 210, such as an NTSC, PAL, SECAM or other TV system video signal. Client device 108 also includes hardware and/or software for providing the user with a graphical user interface (GUI) such as a menu-driven interface. With a GUI or other interface, for example, a user can access various network services, configure client device 108, and/or perform other functions, including requesting the recording or transfer of content in conjunction with a content exchange mechanism.

Client device 108 can communicate with other devices via one or more connections including a conventional telephone line or link 212, an ISDN link 214, a cable link 216, an Ethernet link 218, a DSL link 220, and the like. Client device 108 may use any one or more of the various communication links 212-220 at a particular instant to communicate with any number of other devices, including other client devices 108 and/or a head end of multimedia content distribution system. For example, in addition to receiving content information over any one of communication links 212-220, client device 108 may provide (e.g., transmit) information such as content, a search request, an index of recorded content items, etc. over communication links 212-220 or any other type of communication link. Such other types of communication links may include those appropriate for a local area network (LAN), a Bluetooth® network, an IEEE 802.11b-compliant network, or other wired or wireless network type.

Client device 108 generates video signal(s) 222 and audio signal(s) 224, both of which are communicated to television 136. Video signals 222 and audio signals 224 can be communicated from client device 108 to television 136 via an RF (radio frequency) link, S-video link, composite video link, component video link, co-axial cable link, or other communication link. Although not shown in FIG. 2, client device 108 may include one or more lights or other indicators identifying the current status of the device. Additionally, client device 108 may include one or more control buttons, switches, or other selectable controls for controlling operation of the device.

Figure 3:
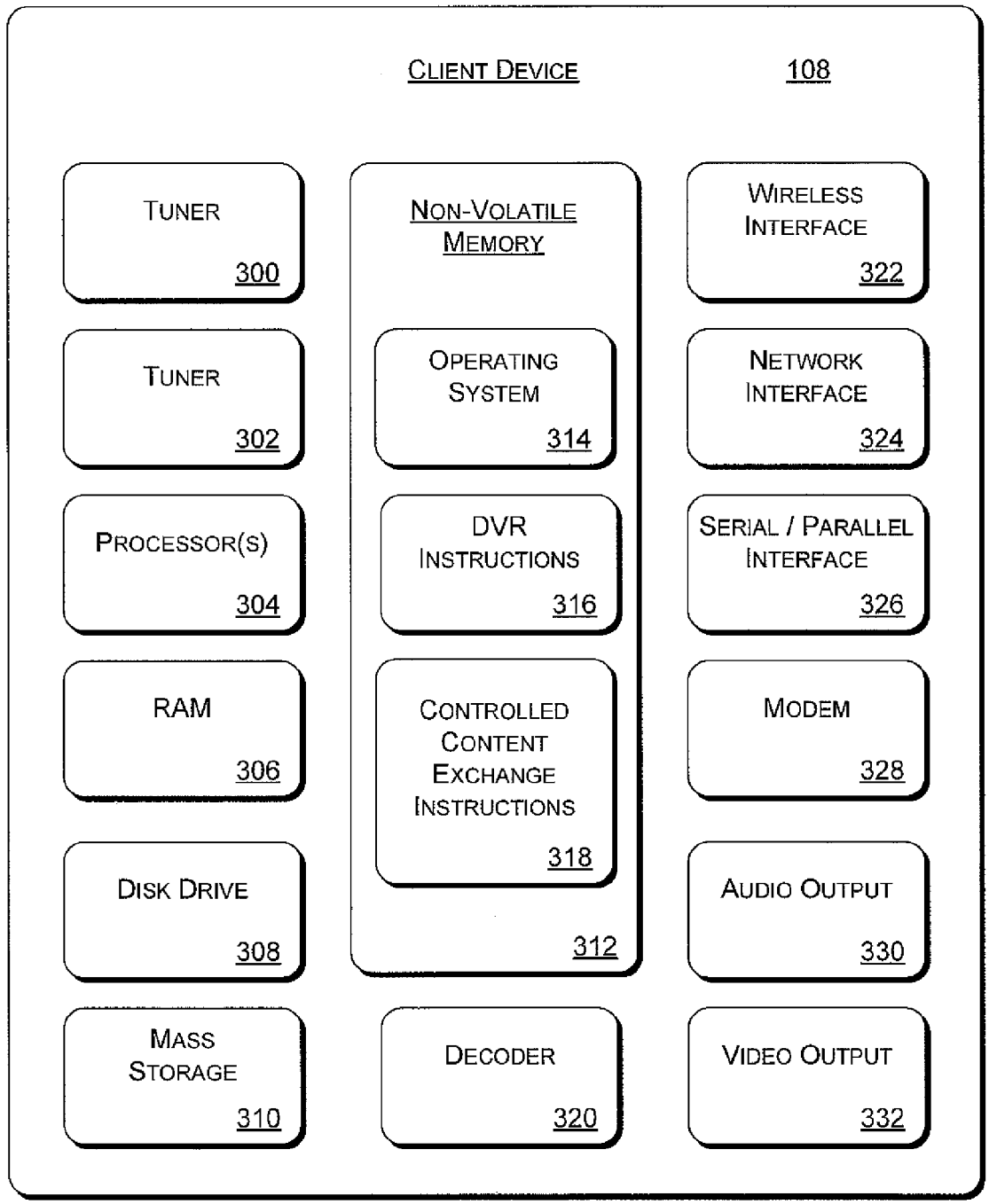
FIG. 3 is a block diagram that illustrates components of the exemplary client devices shown in FIGS. 1 and 2.

FIG. 3 illustrates selected components of exemplary client device 108 that is shown in FIGS. 1 and 2. Client device 108 includes a first tuner 300 and an optional second tuner 302. The tuners 300 and 302 are representative of one or more in-band tuners that tune to various frequencies or channels to receive television signals, as well as at least one out-of-bound (OOB) tuner that tunes to the broadcast channel(s) over which data information is broadcast (e.g., carouseled or otherwise transmitted) to client device 108.

Client device 108 also includes one or more processors 304 which process various instructions to control the operation of client device 108 and to communicate with other electronic and computing devices. Client device 108 can be implemented with one or more memory components, examples of which include a random access memory (RAM) 306, a disk drive 308, another mass storage component 310, and a non-volatile memory 312 (e.g., ROM, Flash, EPROM, EEPROM, etc.). The memory components (e.g., RAM 306, disk drive 308, mass storage 310, and non-volatile memory 312) store various instructions, configuration information, and/or content information for client device 108.

Alternative implementations of client device 108 can include a range of processing and memory capabilities, and may include more or fewer types of memory components than those illustrated in FIG. 3. For example, full-resource clients can be implemented with substantial memory and processing resources, including the disk drive 308 to store content for replay by the viewer. Low-resource clients, however, may have limited processing and memory capabilities, such as a limited amount of RAM 306, a small disk drive 308 (if any), and limited processing capabilities of a processor 304.

An operating system 314 as well as other electronically-executable instructions may be stored in non-volatile memory 312 (and/or other memory component(s) 306, 308, and 310) and executed on processor 304 to provide a runtime environment. A runtime environment facilitates extensibility of client device 108 by allowing various interfaces to be defined that, in turn, allow programs/modules to interact with client device 108. These electronically-executable instructions include, for example, DVR instructions 316 for recording (and playing back) content and controlled content exchange instructions 318. Controlled content exchange instructions 318 may enable client devices 108 to locate and/or transfer content between and among other client devices 108 in accordance with authorization access information. Controlled content exchange instructions 318, which are described further herein, may optionally operate in conjunction with a head end of a multimedia content distribution system.

Client device 108 also includes a decoder 320 to decode a broadcast video signal, such as an NTSC, PAL, SECAM or other TV system video signal. Processor 304, along with tuner(s) 300 and 302 and/or decoder 320, also enables client device 108 to reconstruct audio and video from an MPEG-2 stream or other digital packet signal, whether compressed or uncompressed. Client device 108 can also include other components pertaining to a television-based entertainment system which are not illustrated in this example. For example, client device 108 can include a user interface application and/or user interface lights, buttons, controls, and the like to facilitate viewer interaction with the device.

Client device 108 further includes a wireless interface 322, a network interface 324, a serial and/or parallel interface 326, and a modem 328. Wireless interface 322 allows client device 108 to receive input commands and other information from a user-operated input device, such as from a remote control device or from another IR, Bluetooth, or similar RF input device. Network interface 324 and serial and/or parallel interface 326 allows client device 108 to interact and communicate with other electronic and computing devices via various communication links, including communication links to other client devices 108. Modem 328 facilitates communication by client device 108 with other electronic and computing devices via a conventional telephone line. Although not shown in FIG. 3, client device 108 may also include other types of data communication interfaces to communicate with other devices.

Client device 108 also includes an audio output 330 and a video output 332 that provide signals to a television or other device that processes and/or displays or otherwise renders the audio and video information. Although shown separately, some of the components of client device 108 may be implemented together in an application specific integrated circuit (ASIC) or other manner. For example, electronically-executable instructions (318) and associated processing abilities for authorization access controlled content exchange may be integrated together onto one or more ASICs instead of using more-general memory (e.g., 306, 312, etc.) and/or processing (e.g., 304, etc.) resources of a client device (108).

Additionally, a system bus (not shown) typically connects the various components within client device 108. A system bus can be implemented as one or more of any of several types of bus structures, including a memory bus or memory controller, a peripheral bus, an accelerated graphics port, or a local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Authorized Access Controlled Content Exchange

Figure 4:
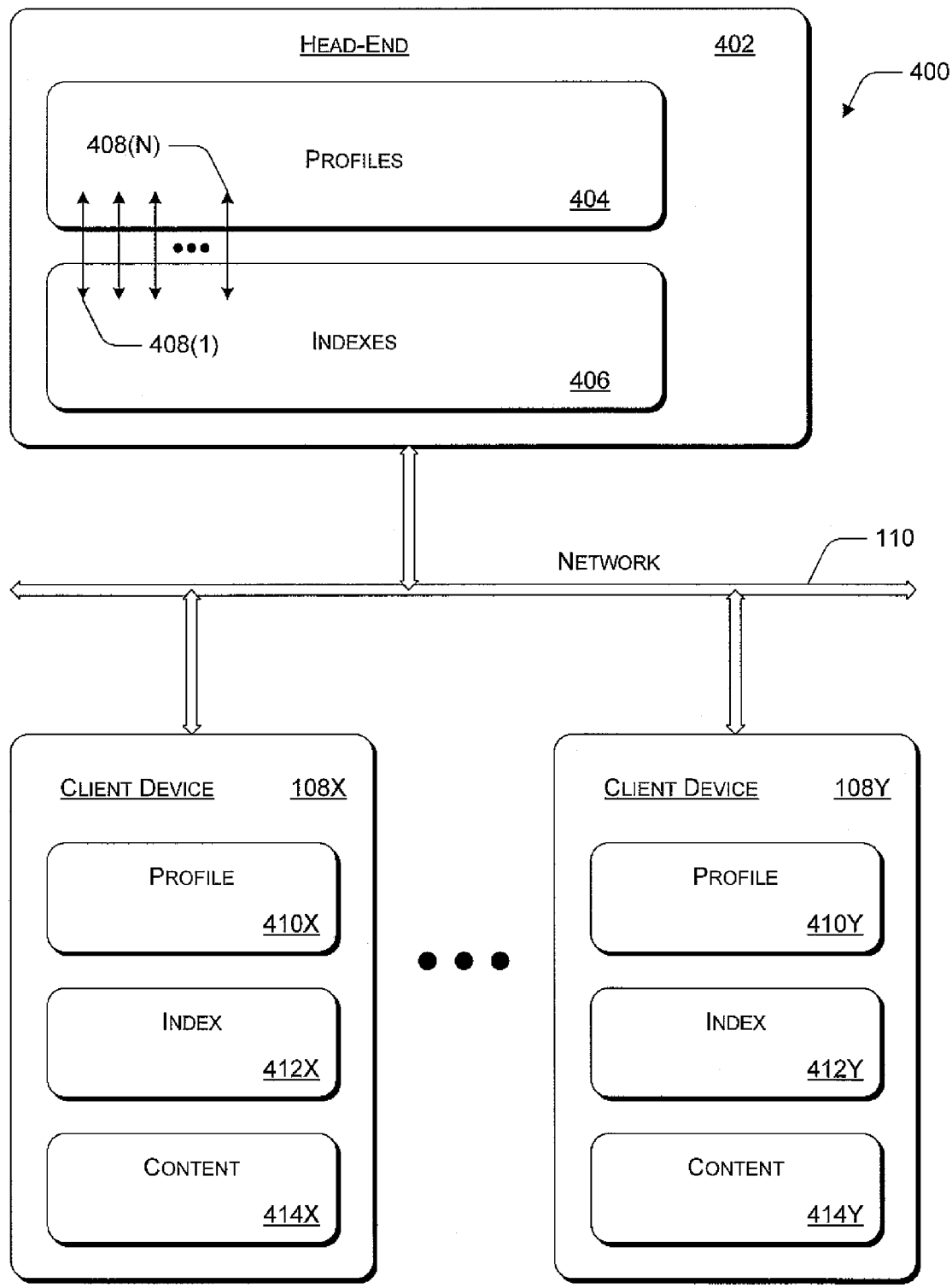
FIG. 4 is a network environment in which exemplary aspects of authorization access controlled content exchange are illustrated.

FIG. 4 is a network environment 400 in which exemplary aspects of authorization access controlled content exchange are illustrated. A head end 402 and multiple client devices 108 are in communication with each other over network 110. Head end 402 provides content and other services/features to client devices 108 over network 110. Head end 402 may therefore correspond at least to one or more of content distribution system 106, content provider 102, other information provider 104, and/or content information from other networks/network providers 142. Although only two client devices 108X and 108Y are illustrated in network environment 400, many more client devices 108 are typically connected to network 110.

Each client device 108 includes a profile 410, a (content) index 412, and (stored) content 414. Hence, client device 108X includes a profile 410X, an index 412X, and content 414X, and client device 108Y includes a profile 410Y, an index 412Y, and content 414Y. Profile 410 provides information regarding a user/subscriber, the client device itself, features and premium services that are subscribed to, and so forth. Profile 410 is described further below with reference to FIG. 8. Index 412 includes multiple entries that are each directed to one or more content items that are stored in content 414. Each index entry of index 412 may include an identification of the stored content, descriptive information, access rights information, and so forth. Each index may be stored as a listing of index entries or in any other format or manner. Index 412 is described further below with reference to FIG. 9.

Head end 402 includes profiles 404 and indexes 406. Generally, profiles 404 may include profiles 410 of client devices 108 that are connected to head end 402 over network 110. Similarly, indexes 406 may include indexes 412 of client devices 108 that are connected to head end 402 over network 110. Specifically, profiles 404 and indexes 406 can include at least profiles 410 and indexes 412, respectively, of those client devices 108 that subscribe to an authorization access controlled content exchange service with head end 402. When a client device 108 changes an entry of profile 410 or index 412, head end 402 is notified so that profiles 404 or indexes 406 may be changed accordingly to ensure that consistency is maintained. Similarly, when a head end 402 makes a change, the respective client device 108 is notified to maintain consistency.

Profiles 404 and indexes 406 may be organized in any fashion. Exemplary organizations include a listing of profiles 410 and indexes 412, respectively; a standard or specialized database format; and so forth. Each respective profile 410n/ index 412n pair (not explicitly shown) from a particular client device 108n may be linked at head end 402 as a profile/index pair 408n, as indicated by linking arrows 408(1), . . . , 408(N). This linking may be established logically, by proximate memory storage, and so forth.

It should be understood that the information in, for example, profile 410X and index 412X may not be identical to the information in the entry or entries of profiles 404 and 406 that correspond to client device 108X (e.g., a profile/index pair 408(X)). For example, the profile portion of profile/index pair 408(X) may include a network address identifier for client device 108X while profile 410X may or may not include the network address identifier for client device 108X. Also, although index 412X may include descriptions, ratings, reviews, etc. of a recorded content item, the corresponding index portion of profile/index pair 408(X) need not include such details. Additionally, in direct search implementations as described herein, profiles 404 and indexes 406 need not be present at head end 402. Likewise, although it would increase bidirectional communication between client devices 108 and head end 402, profiles 410 and indexes 412 need not be present at client devices 108 in search server implementations.

Figure 5:
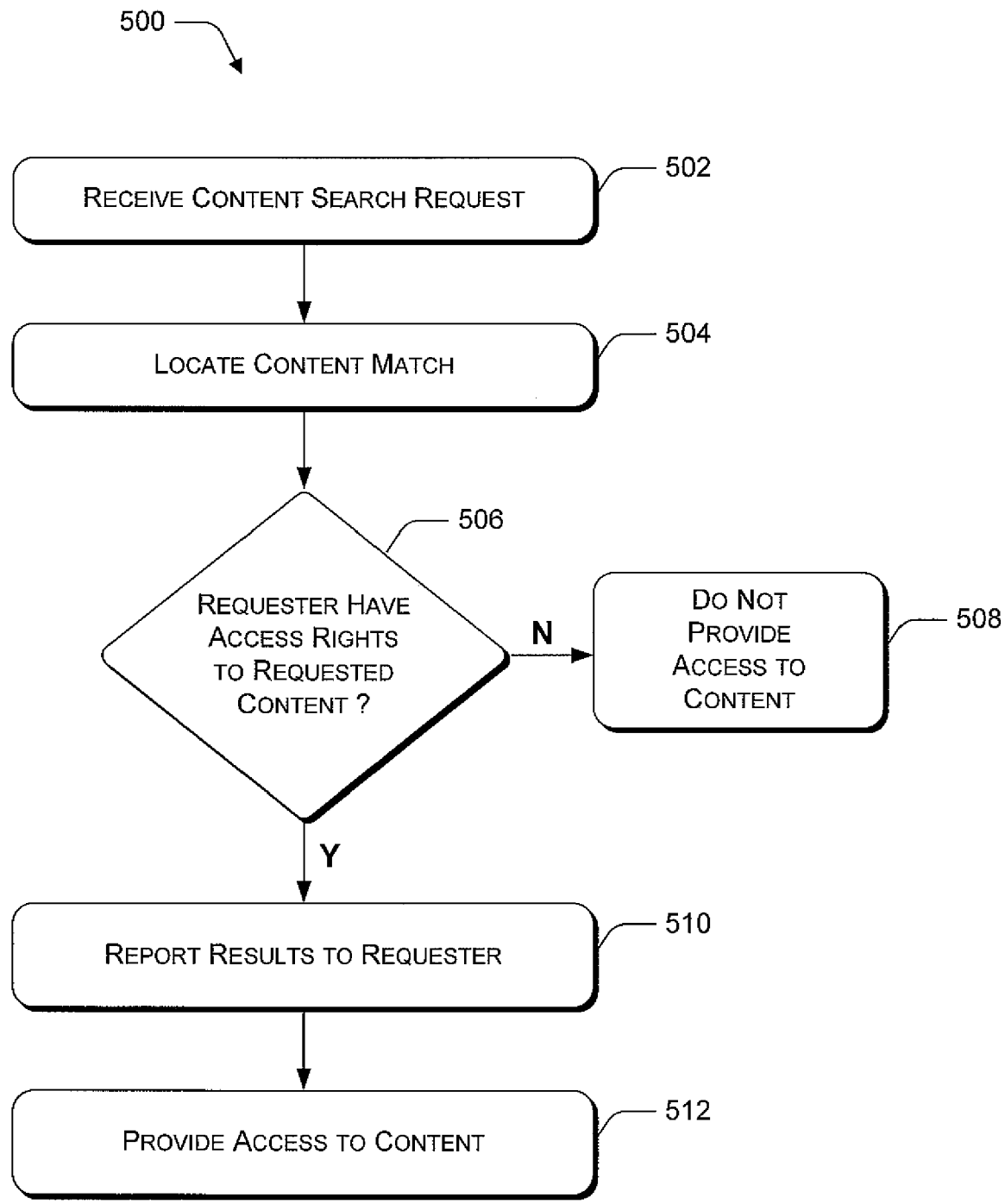
FIG. 5 is a flow diagram that illustrates an exemplary method for authorization access controlled content exchange.

FIG. 5 is a flow diagram 500 that illustrates an exemplary method for authorization access controlled content exchange. The six (6) method blocks 502-512 of flow diagram 500 may be effectuated in network environment 400 (of FIG. 4). However, the method may alternatively be implemented in a different network environment and/or with different hardware. At block 502, a content search request is received. The content search request may be received, for example, by a client device 108 from a user/requester/viewer/subscriber. Alternatively, the content search request may be received by head end 402 from a user/requester/subscriber/client device 108. Consequently, a user, requester, subscriber, etc. may be a person operating a client device 108 or the actual client device 108. At block 504, a content match is located via a search. The search for the requested content is carried out by searching the indexes 412 or the indexes 406. Direct searches may be accomplished by searching indexes 412 that are located at client devices 108. Search server searches may be accomplished by searching indexes 406 that are located at head end 402. These two search manners are described further below.

At block 506, it is determined whether the requester has access rights to the requested content. This determination is made with reference to the profile 410 and/or the profile portion of the profile/index pair 408 of the client device 108 that is used to make the request as well as the index entry of the located content in an index 412 and/or in the index portion of profile/index pair 408 of the client device 108 that is a successful target of the search. In other words, it is generally determined whether there is agreement between authorization access information of the profile information of the requester and the authorization access information of the content.

The authorization access information from the profile information of the requester may be located in profile 410 at the requesting client device 108 and/or in profiles 404 at the head end 402. The authorization access information of the content may be located in content index 412 at the target client device 108 and/or in indexes 406 at the head end 402. Also, the authorization access information of the content may be located in a special database (not shown in FIG. 4) that is at or otherwise accessible to head end 402. Specifically, it is determined whether predetermined authorization access information from the profile of the requestor comports with predefined authorization access information of the requested content.

By way of example but not limitation, it may be determined whether a requester subscribes to a premium content service that originally broadcast or otherwise provided the requested content, which has now been located as being stored on a target client device 108. If the requester does subscribe to the premium content service, then the requester has access rights to the requested content. Conversely, if the requester does not subscribe to the premium content service, then the requester does not have access rights to the requested content. A determination as to whether the requester subscribes to the premium content service may be bifurcated into (i) whether the requester subscribed to the premium content service at the time of broadcast of the requested content and/or (ii) whether the requester subscribes to the premium content service when the content search request is received/initiated and/or when the requested content is transferred to the requester.

If the requester is determined to not have access rights (at block 506), then the requester is not provided access to the content at block 508. If, on the other hand, the requester is determined to have access rights (at block 506), then the requester can be provided access to the content. For example, the search results may be reported to the requester at block 510. In other words, the successful location of a match for the requested content can be reported to the requester. At block 512, access to the requested content can be provided to the requester. For example, the requester can be provided the opportunity to transfer the requested content from the target client device 108 to the requesting client device 108 for storage and/or rendering thereat.

Figure 6:
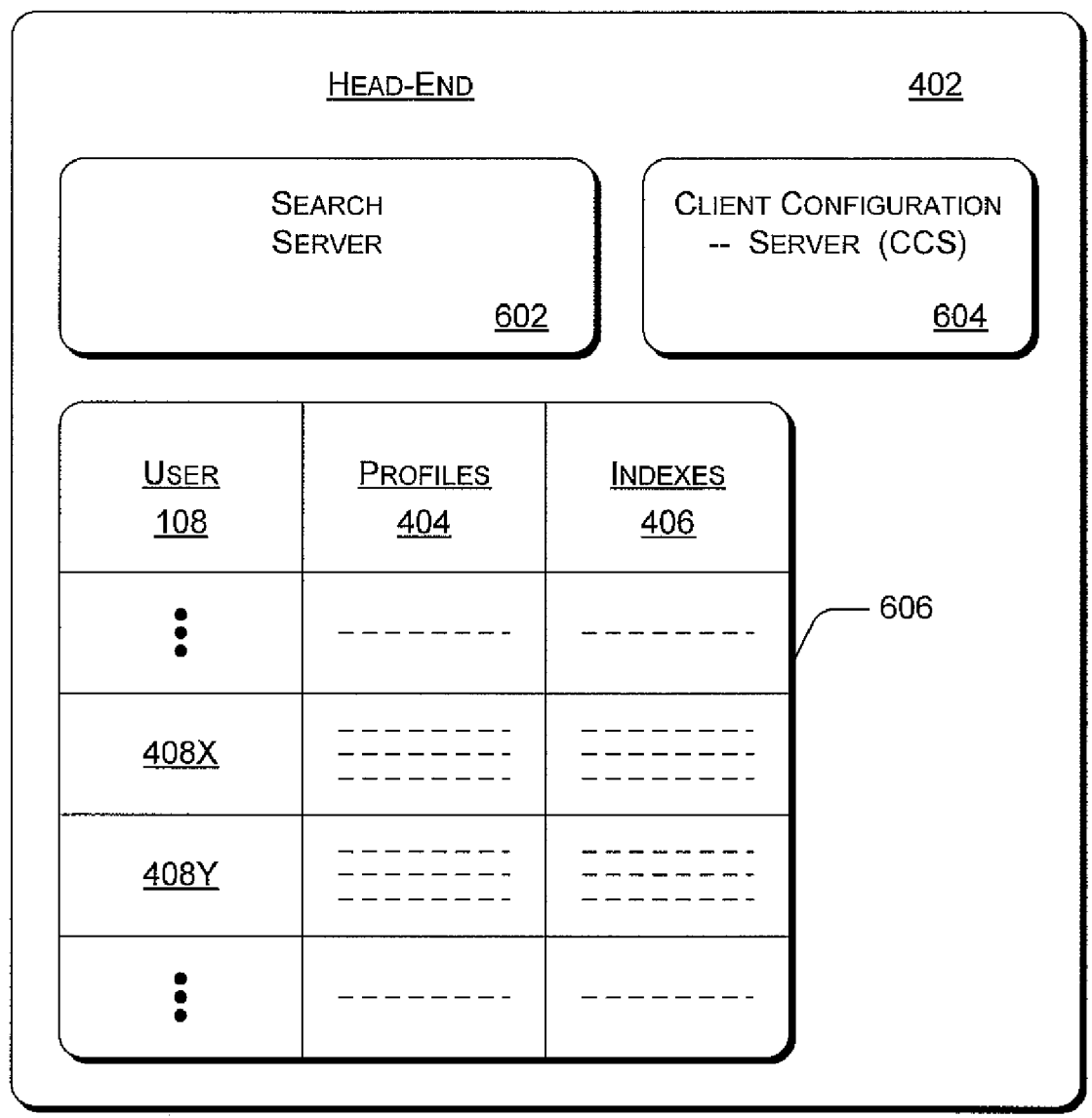
FIG. 6 is an exemplary head end of the network environment of FIG. 4.

FIG. 6 is an exemplary head end 402 of network environment 400 of FIG. 4. Head end 402 includes a search server 602, a client configuration server (CCS) part 604, and a content exchange database 606. CCS part 604 includes instructions for communicating information between head end 402 and multiple client devices 108. The information may include, in addition to general setup and/or configuration information, profile information and index information for content exchange database 606. Search server 602 enables head end 402 to search content exchange database 606 responsive to a requested content search that is received from a requesting client device 108. Search server 602 may be implemented in any of multiple possible manners. For example, search server 602 may be a set of electronically-executable instructions for searching content exchange database 606. Alternatively, search server 602 may be a physically separate server that includes content exchange database 606. Such a physically separate server may be part-of, co-located with, or otherwise accessible to head end 402. Other implementations may instead be used to realize search server 602.

Content exchange database 606 may include profiles 404 and indexes 406. Each profile entry in profiles 404 may be linked to an index entry in indexes 406 according to user/client device 108. Thus, a link or profile/index pair 408X corresponds to client device 108S (of FIG. 4), and a link or profile/index pair 408Y corresponds to client device 108Y. The amount of information in any given profile entry of profiles 404 or any given index entry of indexes 406, and any linkages therebetween, may vary, especially in dependence on what searching abilities and responsibilities are to be allocated to search server 602. For example, if search server 602 is to conduct an entire requested search and determine whether appropriate access rights are held by a requester without contemporaneously interrogating any client devices, then significant information for all entries of both profiles 404 and indexes 406 should be included in content exchange database 606. Alternatively, if search server 602 receives predetermined authorization access information from a profile 410 of a client device 108 (e.g., as part of the search request or responsive to interrogation after finding a successful match), then profiles 404 need not be present as part of content exchange database 606. Other combinations and implementations of content exchange database 606 are possible, more of which are described herein for example with reference to FIGS. 10-11B.

Figure 7:
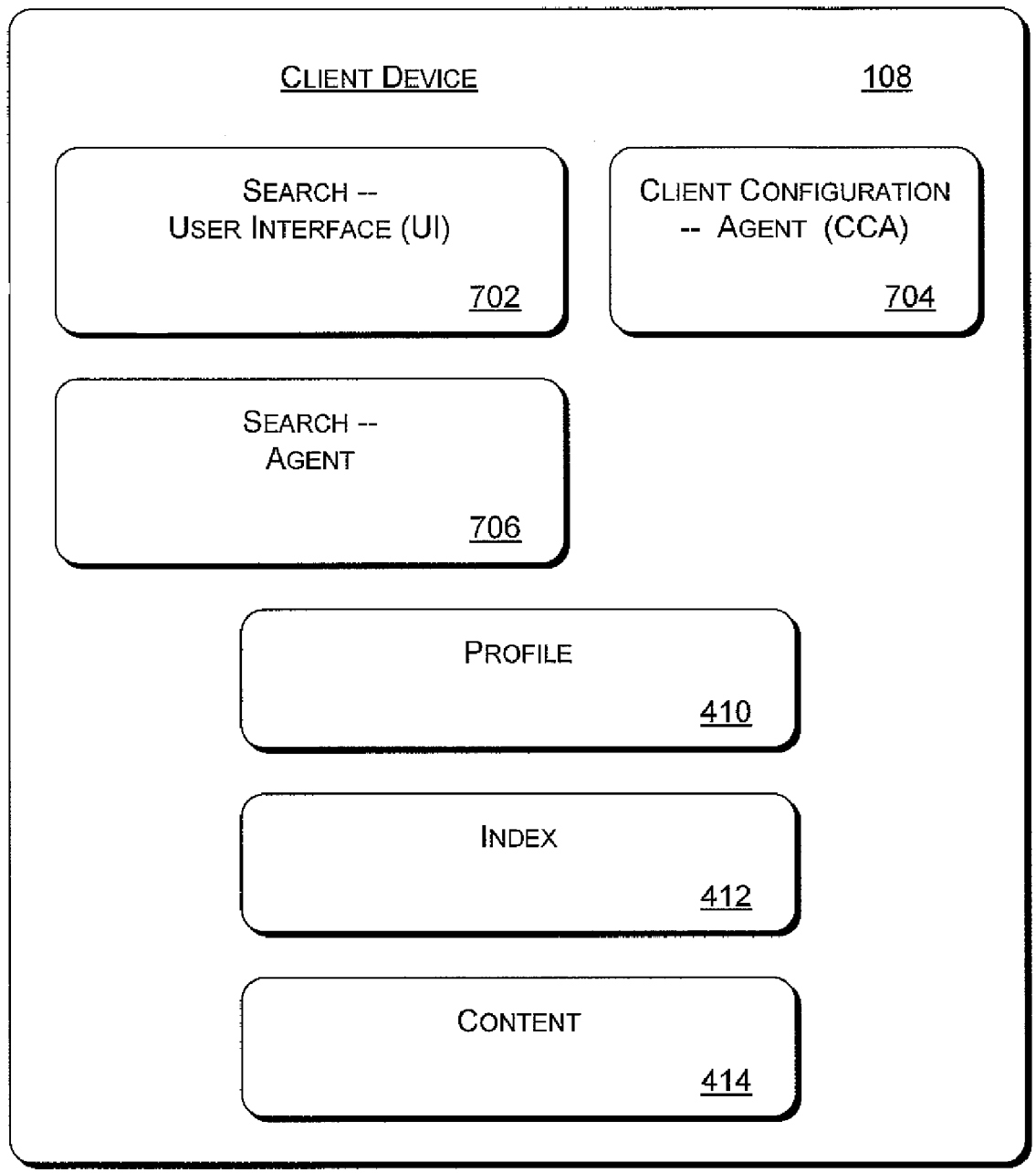
FIG. 7 is an exemplary client device for the network environment of FIG. 4.

FIG. 7 is an exemplary client device 108 for network environment 400 of FIG. 4. Client device 108 includes a profile 410, a content index 412, and stored content 414, as described generally above with reference to FIG. 4. An exemplary profile 410 and an exemplary index 412 are described further below with reference to FIGS. 8 and 9, respectively. Client device 108 also includes a user interface (UI) for searching 702, a client configuration agent (CCA) part 704, and a search agent 706. CCA part 704 includes instructions for communicating information between client device 108 and head end 402. For example, CCA 704 may contact CCS 604 to communicate information from client device 108 to head end 402, or vice versa. The information may include, in addition to general setup and/or configuration information, profile information from profile 410 and index information from index 412 that is destined for content exchange database 606 (of FIG. 6), or vice versa.

Search UI 702 provides a user interface for a user through client device 108 (and possibly a separate display device such as television 136 (of FIG. 1)). The UI can be GUI-based, menu-driven, operable by remote device such as a hand-held remote or keyboard, and so forth. For example, a general services screen may provide an option for the user to select a service or feature which relates to searching content that is stored at other client devices 108. Selecting this option with a remote, keyboard, etc. results in a screen being displayed in which the user can input search criteria such as content name, content broadcast time, and so forth. In fact, the enterable search criteria can be any information that is or may be stored in the content index entry of index 412 that corresponds to the desired content item to which the search is to be directed. Exemplary information that is includable in index entries of index 412 is described further below with reference to FIG. 9.

Search agent 706 responds to instructions received from the user via search UI 702. Thus, search agent 706 causes a search to be performed for the desired/requested content. The search is carried out on content indexes associated with other client devices 108. Search agent 706 is capable of causing searches of these content indexes in multiple manners. These manners include direct searching of indexes 412 using search agent 706, indirect searching of indexes 406 of content exchange database 606 using search server 602, some combination thereof, and so forth. Search agent 706 and/or search server 602 are also capable of ensuring that the user is only permitted to access content to which the user has rights.

Search agent 706 thus causes the search to be performed with reference to authorization access information. Search server 602 or search agent 706 compares predetermined authorization access information from the profile 410 and/or the profile portion of the profile/index pair 408 of the requesting client device 108 to predefined authorization access information associated with the requested content. The predefined authorization access information is stored with the index entry of the content that is determined to match the search request. The index entry may be found in the content index 412 or the content indexes 406, depending on whether a direct search or an indirect search, respectively, was performed.

Search agent 706 and/or search server 602 denies access to the located content if the predetermined authorization access information does not comport with the predefined authorization access information. On the other hand, search agent 706 and/or search server 602 provides access to the located content if the predetermined authorization access information does comport with the predefined authorization access information. Access can be provided by permitting the user to transfer or to schedule a transfer of the requested/located content from the other or target client device 108 to the originating or requesting client device 108 of the user. An exemplary search and transfer process is described further below with reference to FIG. 10.

Figure 8:
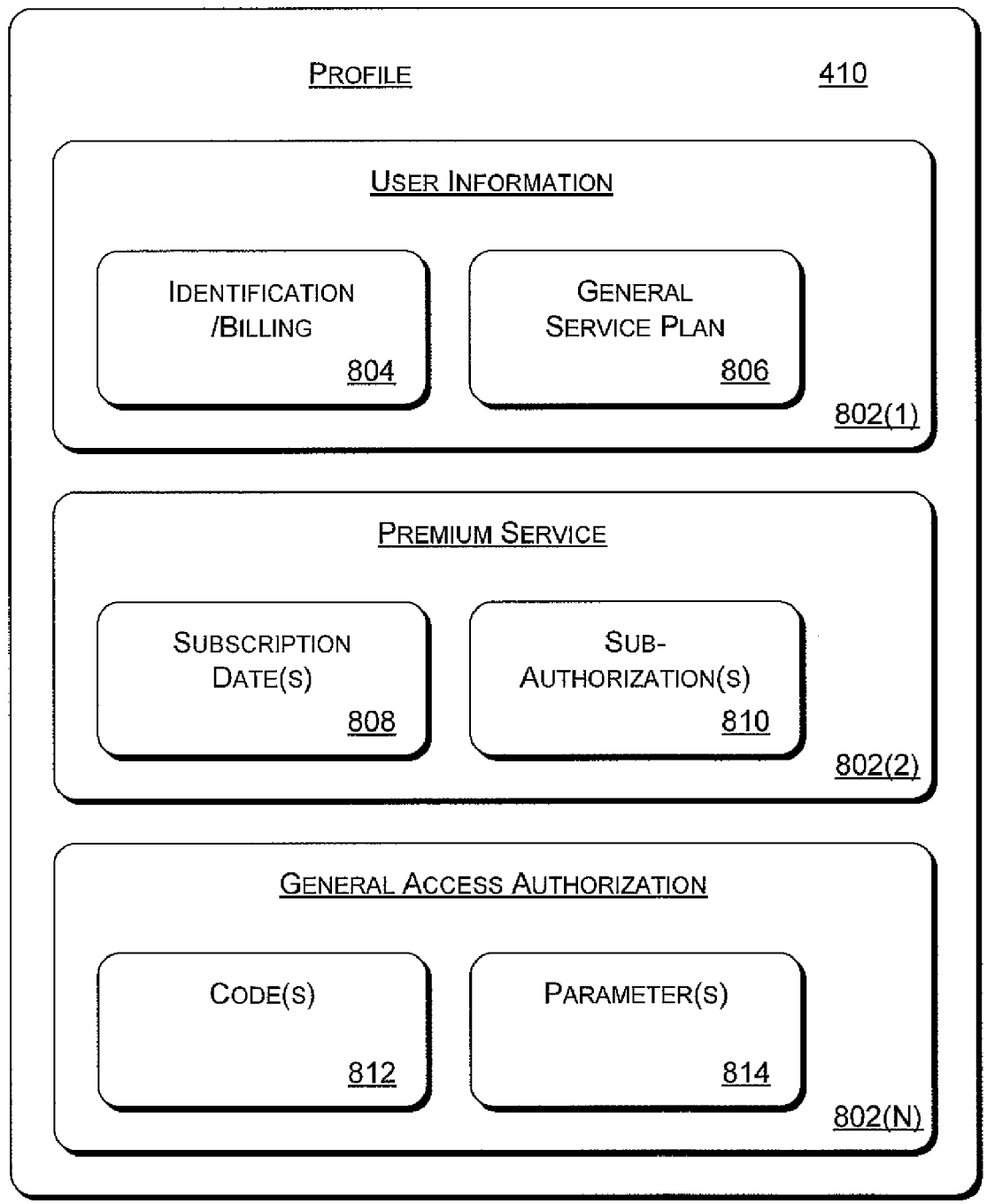
FIG. 8 is an exemplary profile for the network environment of FIG. 4.

FIG. 8 is an exemplary profile 410 for the network environment 400 of FIG. 4. Profile 410 includes one or more profile entries 802. Profile 410 includes predetermined authorization access information that is associated with a client device 108 and/or a user thereof. In other words, the predetermined authorization access information may be portable with respect to client device 108 such that anyone using client device 108 has access rights in accordance with the predetermined authorization access information. Or, the predetermined authorization access information may be portable with respect to the user such that the user can authorize (e.g., using an ID/password combination or other authentication technique) any client device 108 to have access rights in accordance with the predetermined authorization access information.

Exemplary profile entry 802(1) is a user information entry that includes identification/billing information 804 and general service plan information 806. Identification/billing information 804 relates to identification and billing information for a subscriber/user. General service plan information 806 relates to one or more general service plans to which the subscriber/user subscribes. For example, a cable or satellite provider may offer three levels of basic packages, such as silver, gold, and platinum and five optional add-on packages. Each of the packages has corresponding channels to which the subscriber gains access rights when subscribing thereto. General service plan information 806 thus lists which basic and/or add-on packages to which the user has subscribed. This exemplary user information entry or another entry may also include information directed to parental rights that limit viewable/transferable content based on age-appropriateness ratings, including those separated into different types of material such as language, violence, and so forth.

Exemplary profile entry 802(2) is a premium service entry that includes subscription date(s) information 808 and sub-authorization(s) information 810. Each premium service entry corresponds to a premium service provider, for example a service provider that provides multimedia content for an additional, separate fee over and above those charged for general subscription packages. Subscription date(s) information 808 indicates whether the user is a subscriber to the corresponding premium service provider. For example, a starting/enrolling subscription date may be included. Additionally, a current date, a current status, and/or a date of cessation/termination of the premium service subscription may be included. Sub-authorization(s) information 810 relate to possible secondary or second-tier channels associated with a primary or first-tier premium service provider. Alternatively, a single premium service "entry" may list all premium services to which a user subscribes instead of having separate "entries" for each premium service provider.

Exemplary profile entry 802(N) is a general access authorization entry that includes code(s) information 812 and parameter(s) information 814. The general access authorization information of profile entry 802(N) may include any information that indicates a user has rights to view, record, etc. content. In other words, the general access authorization information of profile entry 802(N) can comprise data protecting broadcast rights across recorded media. For example, such information or data may pertain to content originating from intermittent providers such as pay per view services. In a pay per view example, code(s) information 812 may indicate or evidence rights to a particular content item. Parameter(s) information 814, if present, may indicate the number of times the particular content item may be viewed, recorded, transferred, etc. before any such rights expire.

Figure 9:
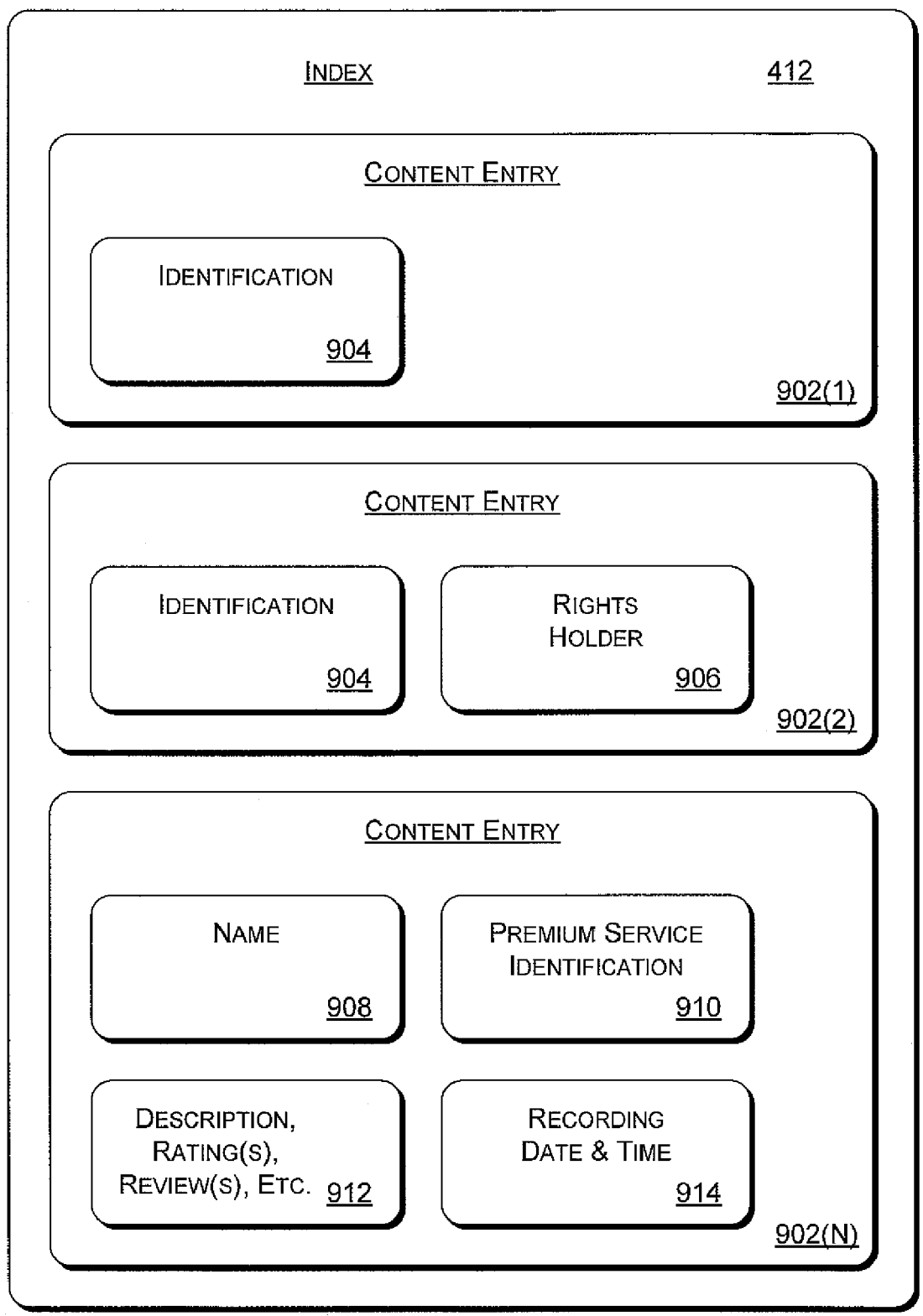
FIG. 9 is an exemplary content index for the network environment of FIG. 4.

FIG. 9 is an exemplary content index 412 for network environment 400 of FIG. 4. Content index 412 includes one or more content entries 902. Each content item stored in content 414 (of FIGS. 4 and 7) may include an associated content entry 902. Each content entry 902 includes information that is related to the associated content and that may be searched, either directly or indirectly, by search agents 706 of other client devices 108. Content index entries 902 that are associated with content items that require special access rights have predefined authorization access information. The predefined authorization access information indicates what access rights are needed to view, record, transfer, etc. the associated content item and/or the identity of the rights holder.

Exemplary content entry 902(1) includes identification information 904. Identification information 904 identifies the associated content item. Exemplary content entry 902(2) includes identification information 904 and rights holder information 906. Rights holder information 906 includes the company, service provider, etc. that holds the viewing, recording, transferring, etc. rights to the associated content item. Each content entry 902 may include any combination of the information types described for content entries 902(1), 902(2), and 902(N).

Exemplary content entry 902(N) includes name information 908, premium service identification 910, description, ratings, reviews, etc. information 912, and recording date and time information 914. Name information 908 includes the name of the content item such as a title of a program, movie, or event. Premium service identification information 910 identifies the premium service provider of the content item by name, code, or the like. Description, ratings (including quality ratings and age-appropriateness ratings), reviews, etc. information 912 includes one or more of a description, a summary, rating(s), review(s), actors/producers/and other artists of the content item, length of the content item, date of production/creation of the content item, and so forth. Recording date and time information 914 includes the date and time at which the recorded content was broadcast and/or recorded. The broadcasting channel may also be recorded.

Figure 10:
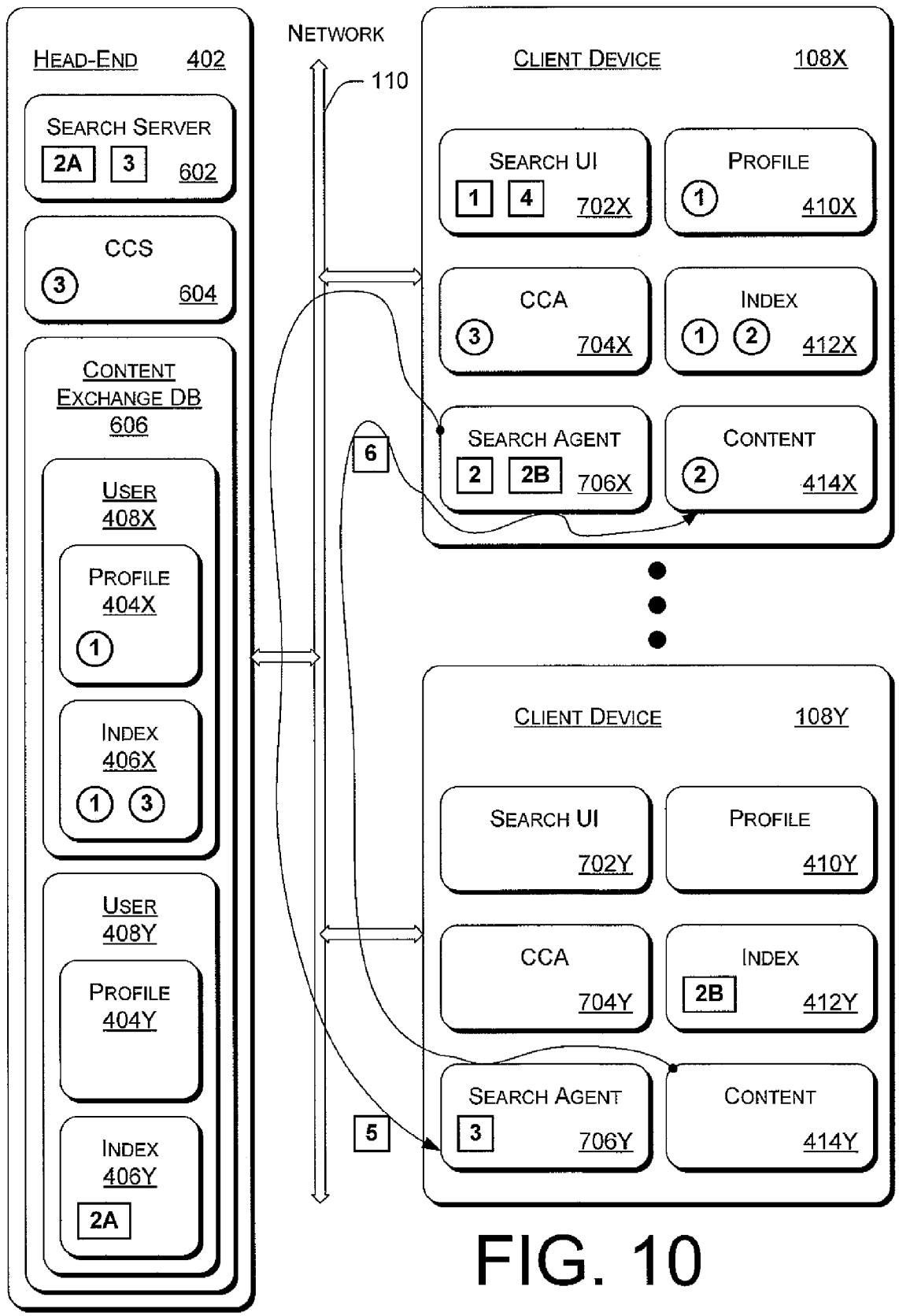
FIG. 10 illustrates an exemplary authorization access controlled content transfer for the network environment of FIG. 4.

FIG. 10 illustrates an exemplary authorization access controlled content transfer for the network environment 400 of FIG. 4. The description of FIG. 10 includes maintaining consistency between indexes in the context of recording content. This context is indicated by numerals 1-3 that are within circles. The description of FIG. 10 also includes a content search with reference to authorization access information in the context of transferring content from one client device to another client device. This context is indicated by numerals 1-6 that are within rectangles.

It is assumed that users of client devices 108X and 108Y subscribe to a controlled content exchange service. In this example, client device 108X is searching for content that is located at client device 108Y The indication numerals in the circles and rectangles focus on this assumption and this example. Furthermore, although content exchange database 606 is illustrated with head end 402, it need not be present if indirect searching via search server 602 is not to be implemented.

At ①, profile 410X and profile 404X are established to reflect the controlled content exchange service subscription. Also, index 412X and index 406X are maintained to be consistent with each other. At ②, a user orders client device 108X to record/save content to content 414X. An index entry is added to index 412X for the stored content item to reflect that the content item is now stored on client device 108X. At ③, this new entry is communicated to head end 402 and added to index 406X for user 408X. Communicating information between client device 108X and head end 402 for the profiles and indexes, as well as for other information, may be accomplished using CCA 704X and CCS 604.

At ①, the user interacts with search UI 702X to request a content search. The search can be based on the name of the desired content or any other information that is stored in the content entries of content indexes 406 or 412. Examples of such information are described further above with reference to FIG. 9. At ②, search agent 706X is launched to conduct the search (i.e., to cause the search to be performed). Search agent 706X may cause the search to be performed indirectly using search server 602 of head end 402, directly by contacting other client devices 108 via network 110, and so forth.

For an indirect search implementation at [2A] search server 602 searches indexes 406 that correspond to multiple client devices 108 of content exchange database 606 until a match is found at index 406Y of user 408Y (corresponding to client device 108Y). For a direct search implementation at [2B], search agent 706X searches indexes 412 that correspond to multiple client devices 108 that are connected to network 110 until a match is found at index 412Y of client device 108Y (corresponding to a user 408Y (not explicitly shown)). Network addresses for potential target client devices 108, if not already present at client device 108X, may be downloaded from head end 402 (e.g., from profiles 404). This direct search can optionally rely on search agents 706 of potential target client devices 108 to effectuate the individual searches. For example, search agent 706X may send a search query to search agent 706Y and permit/request search agent 706Y to search index 412Y of client device 108Y.

At ③, search server 602 or search agent 706X/706Y ascertains a match for the requested content. This match is communicated to search agent 706X along with any relevant information for transferring the desired content from client device 108Y to client device 108X. Such relevant information may include a time when the desired content may be transferred and an estimated duration for the transfer process to be completed. At ④ the user of client device 108X is given a chance to elect to have the desired content transferred from client device 108Y to client device 108X using search UI 702X. At ⑤ search agent 706X communicates with search agent 706Y to establish a time and any relevant parameters for transferring the requested content. At ⑥, the requested content is transferred from content 414Y of client device 108Y to content 414X of client device 108X using, for example, search agent 706Y and search agent 706X. It should be understood that any of the above communications or content transfers may alternatively be effectuated using CCA 704X and CCS 604 or CCA 704Y.

Methods for Authorized Access Controlled Content Exchange

Authorized access controlled content exchange may be described in the general context of electronically-executable instructions. Generally, electronically-executable instructions include routines, programs, objects, components, data structures, and the like that perform particular functions or implement particular abstract data types. Authorized access controlled content exchange may also be practiced in distributed computing environments where functions are performed by remote processing devices that are linked through a communications network. In a distributed computing environment, electronically-executable instructions may be located in both a head end and in multiple remote client devices.

The methods and processes of FIGS. 5, 11, 11A, and 11B are illustrated in flow diagrams divided into multiple blocks. However, the order in which the methods and processes are described is not intended to be construed as a limitation, and any number of the described blocks can be combined in any order to implement one or more methods or processes for authorized access controlled content exchange. Furthermore, although the methods and processes are described below with reference to television entertainment environments 100 and 200, with reference to network environment 400, and with reference to client devices 108 where applicable, the methods and processes can be implemented in any suitable network environment and using any suitable hardware, software, firmware, or combination thereof.

Figure 11:
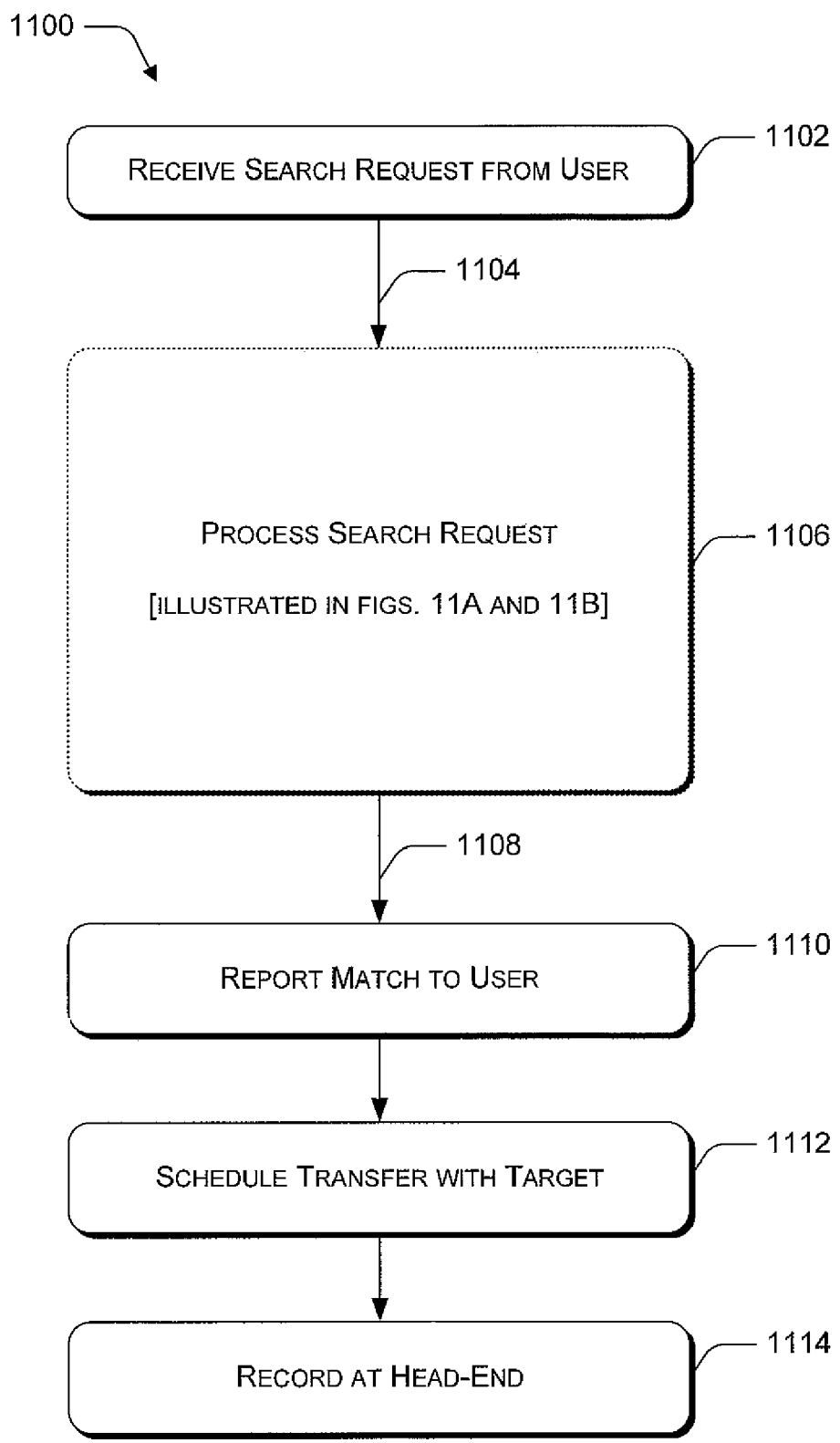
FIGS. 11, 11A, and 11B are flow diagrams that illustrate exemplary methods for authorization access controlled content exchange.
Figure 11A:
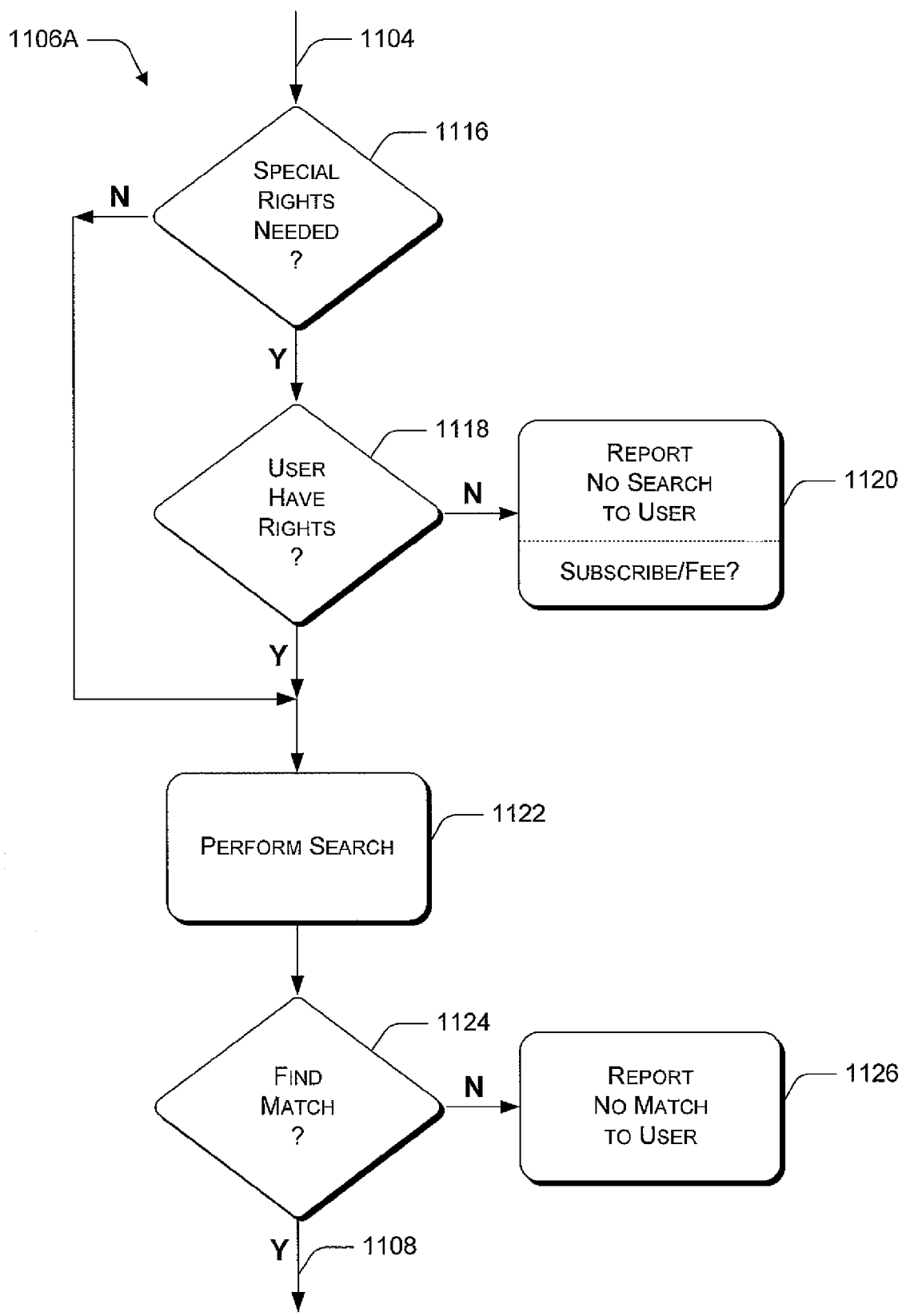
Figure 11B:
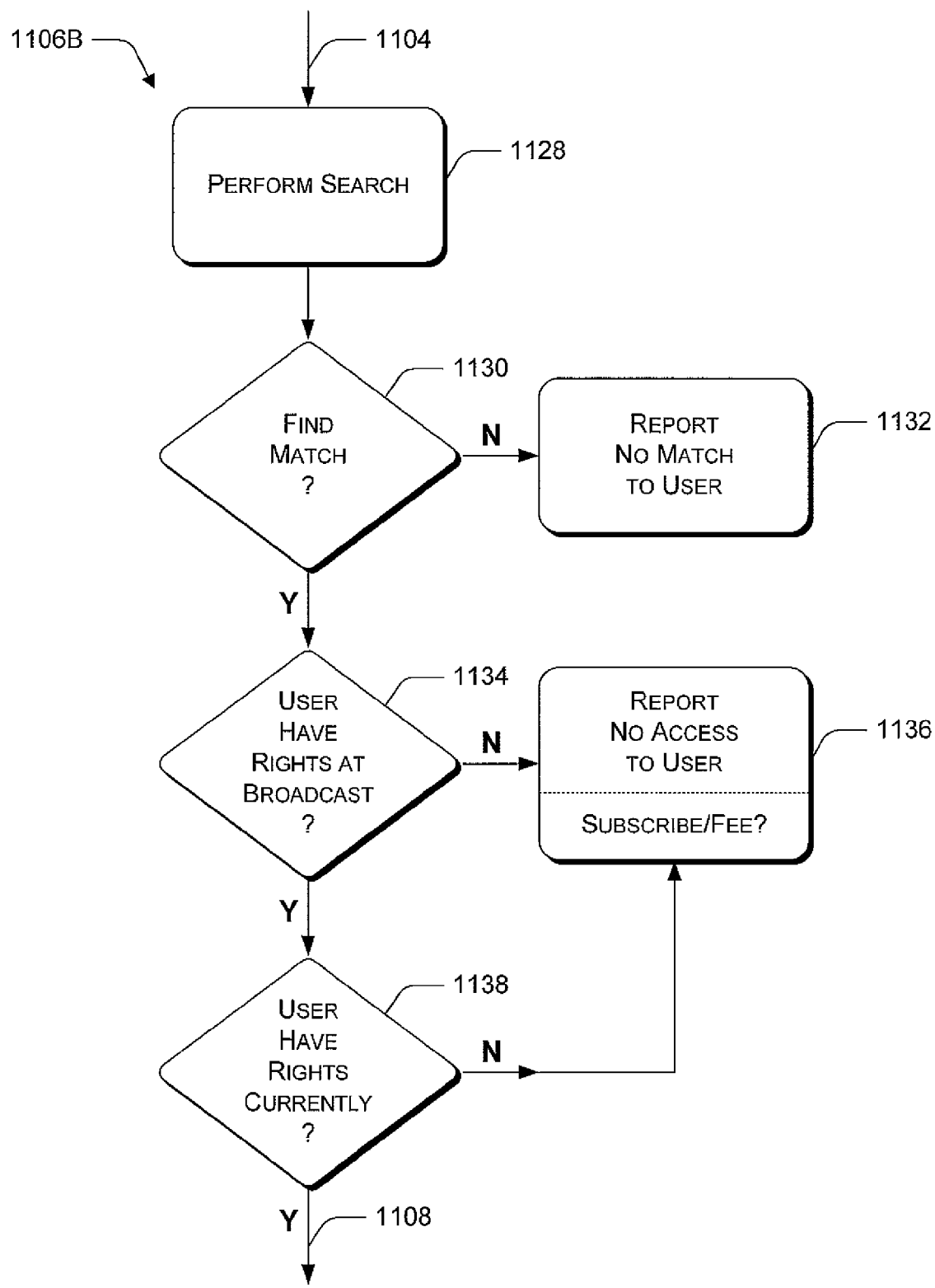

FIGS. 11, 11A, and 11B are flow diagrams 1100, 1106A, and 1106B, respectively, that illustrate exemplary methods for authorization access controlled content exchange. Flow diagram 1100 includes five (5) blocks 1102, 1106, and 1110-1114. Method block 1106 represents two alternative approaches that each includes multiple other blocks. These two alternative approaches are illustrated in FIGS. 11A and 11B as flow diagrams 1106A and 1106B, respectively.

At block 1102 of flow diagram 1100, a search request for content is received from a user. For example, a search request can be received from a subscriber at a client device 108, or a search request can be received from a client device 108 at a head end 402. At block 1106, the search request is processed. Two exemplary approaches for processing the search request are illustrated at FIGS. 11A and 11B. The input and output flows of the search request processing of block 1106 are indicated by flow arrows 1104 and 1108, respectively; these flow arrows 1104 and 1108 are reproduced in flow diagrams 1106A and 1106B for clarity. FIG. 11A illustrates an approach in which a search is performed if the requesting user has any needed special rights. FIG. 11B illustrates an approach in which a search may be performed or started before knowing if the requesting user has any special rights that may be needed to access the requested content.

In flow diagram 1106A of FIG. 11A, it is determined whether any special rights are needed to access the requested content at block 1116. This determination may be made at a client device 108 or a head end 402. For example, client device 108 may be able to "quickly" determine that the rights holder of the requested content is a premium service provider based on information from an EPG that evidences that the premium service provider provided the requested program or based on a channel provided in the content request. Alternatively, head end 402 may make this determination by consulting a special database that associates content with the rights holder or holders thereof.

If special rights are determined to be needed (at block 1116), then it is determined whether the user has such rights at block 1118. This determination may be accomplished by comparing the special rights information (e.g., the predefined authorization access information) attained in block 1116 to predetermined authorization access information of profile 410/404 of the requesting client device 108, for example at head end 402. At client device 108, on the other hand, this determination may be accomplished by reviewing profile 410 and comparing the information therein to any ascertained rights holder information.

If the user does not have the needed special rights (as determined at block 1118), then it can be reported to the user that no search was performed and that no access to the content is currently available to the user at block 1120. This reporting can be accomplished using a search UI 702, for example. The multimedia content distribution system may also give the user an opportunity to subscribe to the premium service or otherwise pay a fee in order to gain access to the content at block 1120.

If no special rights are needed (as determined at block 1116) or special rights are needed to access the content but the user possesses such rights (as determined at blocks 1116 and 1118), then the search is performed at block 1122. The search may be performed indirectly using a search server 602 and a content exchange database 606 of head end 402 or directly using a search agent 706 of the requesting client device 108 and indexes 412 of target client devices 108. Alternatively, search server 602 can be enabled to search indexes 412 of target client devices 108 to maintain greater control at head end 402, to decrease any privacy concerns, and so forth.

If a match is not found at block 1124 from the search (of block 1122), then a no match search result is reported to the user at block 1126. This can be reported using a CCS 604 and CCA 704 for communications between client device 108 and head end 402 and/or using a search UI 702 for communications between client device 108 and a viewer. If, on the other hand, a match is found at block 1124 from the search (of block 1122), then the method can continue at block 1110 (of FIG. 11) as indicated by flow arrow 1108. Blocks 1110-1114 of flow diagram 1100 are described further below.

In flow diagram 1106B of FIG. 11B, a search for the requested content is performed at block 1128. The search may be performed indirectly using a search server 602 and a content exchange database 606 of head end 402 or directly using a search agent 706 of the requesting client device 108 and indexes 412 of target client devices 108. In either search manner, information input as parameter(s) for the search that is related to the requested content is compared to information in the indexes 406 or 412. If a match is not found at block 1130, then the absence of a match is reported to the user at block 1132. This report can occur between head end 402 and requesting client device 108 and/or between the client device 108 and a viewer. If, on the other hand, a match is found at block 1130, then the search results are adjusted responsive to authorization access information.

This adjustment may be accomplished at least partly by comparing predetermined authorization access information of a profile entry corresponding to the requesting client device 108 to predefined authorization access information of an index entry corresponding to the requested content that was located (at blocks 1128 and 1130). For the predetermined authorization access information to comport with the predefined authorization access information in this particular implementation, the user needs to have rights to the requested content based on the rights holder and based on the dates of those rights. In other words, not only does the user need to have a subscription with the rights holder the user needs to have had the subscription at the time of broadcasting of the requested content.

At block 1134, it is determined whether the user had rights to the requested content at the time of the broadcast. If the user did not have rights at the time of the broadcast, then it is reported to the user that no access is available at block 1136. However, the user may optionally be given the option to subscribe and/or pay a fee in order to gain access to the requested content. If, on the other hand, the user did have rights at the time of the broadcast (as determinable in block 1134), then it is determined or verified that the user currently has rights to the requested content at block 1138. If the user does not currently have rights, then the no access report is provided to the user (at block 1136). If the user does have rights currently (as determinable in block 1138), then the method can continue at block 1110 (of FIG. 11) as indicated by flow arrow 1108.

Assuming that a content match is found during the search request processing of block 1106, the match is reported to the user at block 1110. The reporting can include an inquiry directed to whether the user wishes to accept the opportunity to transfer the located content. If the content transfer opportunity is accepted, the requesting client device 108 can schedule a transfer time with the target client device 108 at block 1112. After the transfer of the content, at block 1114 the index at head end 402 that corresponds to requesting client device 108 is updated to reflect the content that is now stored thereat. The content transfer itself may also be logged at the head end. Thus, in either case, the event is recorded at head end 402.

CONCLUSION

Although systems and methods have been described in language specific to structural features and/or methods, it is to be understood that the invention defined in the appended claims is not necessarily limited to the specific features or methods described. Rather, the specific features and methods are disclosed as exemplary forms of implementing the claimed invention.

The invention claimed is:

1. A client device that is capable of controlling content exchange in a multimedia content distribution system, comprising:

at least one search agent that is capable of causing searches for content to be performed with reference to authorization access information, the authorization access information including predetermined authorization access information that is associated with the client device and predefined authorization access information that is associated with the content; the at least one search agent capable of determining whether the predetermined authorization access information comports with the predefined authorization access information responsive to one or more of the searches; and a content index having a plurality of index entries, each index entry of the plurality of index entries corresponding to at least one content item;

wherein the at least one search agent is adapted to enable access to the content via the client device if the predetermined authorization access information comports with the predefined authorization access information;

wherein the at least one search agent is adapted to enable access to the content via the client device by:

causing a positive match result from a search to be displayed and by providing an opportunity to request a transfer of the content to the client device; and causing the content to be transferred from a target client device to the client device in response to receiving a request to transfer the content to the client device; and wherein the determining by the at least one search agent comprises:

comparing a plurality of rights holders from the predetermined authorization access information to a rights holder from the predefined authorization access information; and comparing subscription date information from the predetermined authorization access information to an original broadcast date of the content from the predefined authorization access information.

2. The client device as recited in claim 1, wherein the content comprises multimedia content.

3. The client device as recited in claim 1, wherein the authorization access information comprises at least one of a user profile, a parental rights setting, and data protecting broadcast rights across recorded media.

4. The client device as recited in claim 1, further comprising:
one or more network interfaces, the one or more network interfaces capable of at least receiving the content for the client device.

5. The client device as recited in claim 4, wherein the one or more network interfaces comprise at least one wired network interface or at least one wireless network interface.

6. The client device as recited in claim 1, wherein the client device comprises at least one of a set-top box (STB), a personal computer (PC), a personal digital assistant (PDA), a mobile telephone (MT), a tablet PC, and a pocket or hand-sized PC.

7. The client device as recited in claim 1, wherein the at least one search agent is capable of said causing and said determining by directly searching each content index of a plurality of client devices by directly communicating with each client device of the plurality of client devices.

8. The client device as recited in claim 1, wherein the at least one search agent is capable of said causing and said determining by indirectly searching each content index of a plurality of client devices by communicating with a search server of a head end of the multimedia content distribution system.

9. The client device as recited in claim 1, further comprising:
a profile that comprises at least a portion of the predetermined authorization access information.

10. A client device that is capable of controlling multimedia content exchange, comprising:
at least one search agent that is capable of causing searches for multimedia content to be performed with reference to authorization access information; the multimedia content stored at a plurality of other client devices, the authorization access information including predetermined authorization access information that is associated with the client device and predefined authorization access information that is associated with the multimedia content; the at least one search agent capable of determining whether the predetermined authorization access information comports with the predefined authorization access information responsive to one or more of the searches;
wherein the at least one search agent is adapted to enable access to the multimedia content via the client device if the predetermined authorization access information comports with the predefined authorization access information; and
wherein the determining by the at least one search agent comprises comparing subscription date information from the predetermined authorization access information to an original broadcast date of the content from the predefined authorization access information.

11. A client device that is capable of authorization access controlled content exchange, comprising:
a profile that is directed to predetermined authorization access information that includes subscription date information that indicates access rights to content;
a content index including a plurality of content index entries, each content index entry of the plurality of content index entries directed to at least one content item and including identification thereof and predefined authorization access information related thereto; and
at least one search agent that is capable of causing searches for content to be performed by searching a plurality of content indexes, each content index of the plurality of content indexes corresponding to a particular client device of a plurality of other client devices, the content being searched stored at the plurality of other client devices;
wherein the client device is permitted to transfer the content that is associated with predefined authorization access information to which the predetermined authorization access information comports and is prevented from transferring the content that is associated with predefined authorization access information to which the predetermined authorization access information does not comport;
wherein the at least one search agent is capable of determining whether the predetermined authorization access information comports with the predefined authorization access information; and
wherein the determining by the at least one search agent comprises comparing subscription date information from the predetermined authorization access information to an original broadcast date of the content from the predefined authorization access information.

12. The client device as recited in claim 11, further comprising:
a plurality of content items stored in a memory.

13. The client device as recited in claim 12, wherein at least one content item of the plurality of content items comprises multimedia content.

14. The client device as recited in claim 12, wherein each content item of the plurality of content items has a corresponding content index entry of the plurality of content index entries.

15. The client device as recited in claim 11, wherein the profile includes a plurality of profile entries, each profile entry of the plurality of profile entries comprising at least one of user information, premium content service provider information, and general access authorization information.

16. The client device as recited in claim 11, wherein the predefined authorization access information for each content index entry of the plurality of content index entries comprises at least one of rights holder information and a premium content service provider identification.

17. The client device as recited in claim 11, wherein the plurality of content indexes that are searched for the content are located at a head end of a multimedia content distribution system; and wherein the at least one search agent is further capable of causing the searches for the content to be performed at the head end.

18. The client device as recited in claim 11, wherein each content index of the plurality of content indexes that are searched for the content is located at a respective particular client device of the plurality of other client devices; and wherein the at least one search agent is further capable of causing the searches for the content to be performed at the plurality of other client devices.

* * * * *